United States Patent [19]

Hasegawa et al.

[11] 3,917,512

[45] Nov. 4, 1975

[54] LIMONOATE:NAD (P) OXIDOREDUCTASE

[75] Inventors: Shin Hasegawa, Pasadena; Linda C. Brewster, Carson; Vincent P. Maier, Newport Beach, all of Calif.

[73] Assignee: The United States of America as represented by the Secretary of Agriculture, Washington, D.C.

[22] Filed: Apr. 15, 1974

[21] Appl. No.: 461,181

[52] U.S. Cl..................... 195/62; 195/65; 195/66 R
[51] Int. Cl.²......................................... C12D 13/10
[58] Field of Search...................... 195/62, 65, 66 R

[56] References Cited
UNITED STATES PATENTS 2,563,855  8/1951  McColloch et al. .............. 426/51 X

*Primary Examiner*—Lionel M. Shapiro
*Attorney, Agent, or Firm*—M. Howard Silverstein; Max D. Hensley; William Takacs

[57] ABSTRACT

Development of bitterness in citrus products and by-products is reduced by treatment with a previously-unknown enzyme, limonoate:NAD(P) oxidoreductase. This enzyme is prepared by culture of Pseudomonas- sp. 321-18 on a nutrient medium containing sodium limonoate.

3 Claims, No Drawings

LIMONOATE:NAD(P) OXIDOREDUCTASE

DESCRIPTION OF THE INVENTION

This invention relates, in general, to enzymic reactions and to the processing of citrus products and by-products, particularly citrus juices.

One object of the invention is to provide methods for treating citrus juices and other citrus products and by-products, whereby to prevent or at least reduce the development of bitterness therein.

Another object of the invention is to provide a new enzyme and methods for preparing the same, said enzyme being useful for improving the properties of citrus juices and other citrus products and by-products.

Further objects of the invention will be evident from the following description wherein parts and percentages are by weight unless otherwise specified. the abbreviation "ppm." used herein refers to parts per million.

The formulas given below depict several compounds pertinent to the invention. As will be more fully explained below, limolin (Formula I) is the compound responsible for bitterness in citrus juices, wherein it is formed from the non-bitter precursor, limonoate A-ring lactone (Formula II). The compound limonoic acid (Formula III) is a derivative of limonin, and may be prepared in known manner by alkaline hydrolysis of both lactone rings of the latter. The last compound, 17-dehydrolimonoate A-ring lactone (Formula IV) is the end product formed from limonoate A-ring lactone when citrus juice is subjected to the enzyme treatment in accordance with the invention.

Limonin (Formula I)

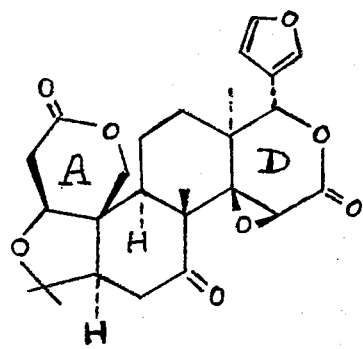

Limonoate A-ring lactone (Formula II)

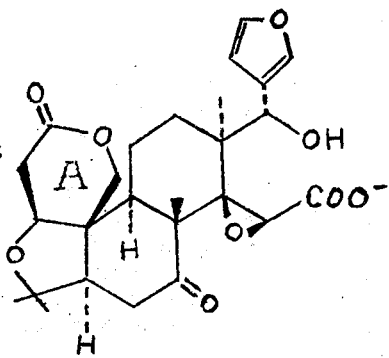

Limonoic Acid (Formula III)

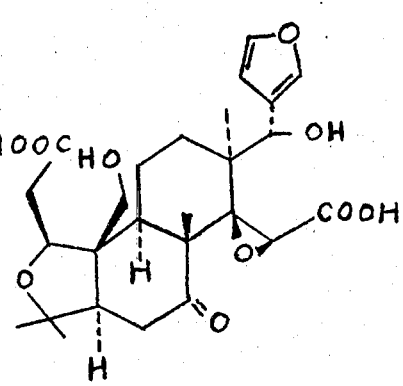

17-Dehydro-Limonoate A-ring lactone (Formula IV)

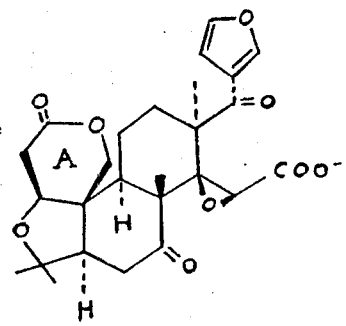

In the following description, the application of the invention to navel orange juice is stressed. It should be understood that this particular embodiment of the invention is provided by way of illustration and not limitation. In its broad ambit the invention is applicable to products and by-products from all kinds of citrus fruits, including oranges, lemons, grapefruit, tangerines, mandarins, limes, tangelos, citrus hybrids, and the like. Such products and by-products include juices, concentrates, purees, pulps, seed material, and the like.

Despite the abundance of high-quality navel oranges each year, very little of the fruit is consumed in the form of unblended navel orange juice. This is due to the fact that the juice from navel oranges becomes bitter soon after it is extracted from the fruit.

Heretofore, no practical method has been found to remove the bitterness from the juice or to prevent its formation. Early investigators observed that juice from late-season navel oranges tended to have less bitterness than juice from early-season fruit. Unfortunately, the low bitterness levels were reached very late in the harvest season, after most of the crop had been harvested. Other investigators attempted to simulate this natural debittering process by storing early-season navel oranges in warm, moist rooms. Although some debittering was achieved during prolonged storage, this approach had a number of serious drawbacks which prevented its commercialization. These disadvantages included the growth of molds and other microorganisms, the large amount of time required, the development of off-flavors, and the necessity for special storage rooms.

An object of the present invention is to obviate the problems outlined above. In accordance with the invention navel orange juice (or other citrus juice) is treated with a particular agent whereby to reduce the development of bitterness in the juice. The agent used in accordance with the invention is a hitherto-unknown enzyme, which we have named "limonoate:NAD(P) oxidoreductase." For the sake of brevity, this enzyme is herein referred to as LOR-P.

The mechanism by which bitterness is developed in navel orange juice and the action of LOR-P on this mechanism are explained as follows:

The compound responsible for the bitter flavor in citrus juice is limonin. This bitter principle is produced, after the juice is extracted, in a manner represented by the following scheme -

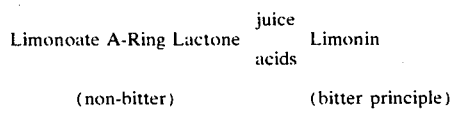

The non-bitter substance, limonoate A-ring lactone, occurs naturally in the fruit tissues where it is stable and remains non-bitter. However, when the fruit tissues are ruptured, as in juice extraction, this normally non-bitter substance is attacked by the juice acids and is converted into limonin. Because of its intense bitterness, only a very small amount of limonin is needed to render the juice unpalatable.

By reference to the preceding formulas, it will be seen that the reaction which causes bitterness is one of lactonization of the adjacent OH and COOH groups of the precursor, thereby forming a closed ring, namely, the one designated as D in Formula I.

In the process of the invention, LOR-P acts upon the limonin precursor (limonoate A-ring lactone), producing 17-dehydrolimonoate A-ring lactone as the end product. This compound is not bitter and is not convertible to limonin by any of the substances (chemical or biochemical) present in citrus juices. The net result is that the limonin precursor is effectively removed from the juice, whereby development of bitterness is prevented or at least substantially reduced.

PREPARATION OF THE ENZYME

It may be pointed out first that LOR-P is a previously-unknown enzyme, which exhibits the specific ability of forming 17-dehydro derivatives from limonoids. For example, it converts limonoate A-ring lactone into 17-dehydrolimonoate A-ring lactone. It also converts limonoic acid, or its salts, into 17-dehydrolimonoate. The formula of the latter compound is like that shown in IV above, except that the A-ring is open. It may also be noted that the enzyme has optimum activity at a pH of about 8.0.

LOR-P requires for its action the presence of nicotinamide-adenine dinucleotide (NAD) or nicotinamide-adenine dinucleotide phosphate (NADP). That is, either NAD or NADP must be present in the reaction mixture as a hydrogen acceptor in order for the enzyme to exert its dehydrogenating action. Consequently, this enzyme is classified as a limonoate:- NAD(P) oxidoreductase. It should be noted that it is not essential to add NAD or NADP when orange juice or other citrus products or by-products (except products from seeds) are treated with the enzyme in order to prevent the development of bitterness. There is a sufficient amount of NAD and NADP naturally present in these citrus materials so that the enzyme can act on the bitterness precursor (LARL). However, if desired, either NAD or NADP can be added to expedite the desired reaction. LOR-P exhibits twice as much activity in the presence of NADP as in the presence of NAD. Thus, NADP is the preferred additive to expedite the reaction.

Another method for increasing the rate of debittering can be explained as follows: Orange juice contains the reduced forms of NAD and NADP, referred to as NADH and NADPH, naturally and as a result of the debittering reaction. These latter materials can be converted enzymatically to NAD and NADP to form a cycle for re-use of the cofactors. Therefore, to expedite debittering one simply adds the proper enzyme, i.e., one which oxidizes NADH and NADPH to NAD and NADP, respectively. One such enzyme is diaphorase; other enzymes which have similar action will be obvious to those skilled in the art.

It has been found that zinc ion increases the activity of LOR-P. Since zinc ion is present in the medium used to prepare the enzyme, this ion is incorporated into the enzyme and it is not required to add any further zinc ion when the enzyme is used to prevent the development of bitterness in citrus juices and the like. However, addition of zinc ion might be used to increase the rate of debittering.

LOR-P is further characterized by its stability in acidic solutions. For example, the enzyme retains 90% of its original activity at 23° C. when held for 5 minutes at pH 3.5 and 31% of its original activity at 33° C. when held for 5 minutes at pH 3.5.

In accordance with the invention, LOR-P is prepared by culturing Pseudomonas-sp. 321–18 (hereafter P-321–18) on a nutrient medium containing limonoate ion. The critical ingredient of the medium is the limonoate ion, and this may be supplied by limonoic acid or its alkali metal salts, the sodium salt being preferred. The other ingredients of the medium are those conventionally used in culturing bacteria. Thus, as conventional in the art, the medium contains an assimilable carbon source, an assimilable nitrogen source, and mineral salts. The assimilable carbon source is, as noted above, provided by limonoate ions. The nitrogen source is provided by inorganic salts such as alkali metal nitrates or ammonium salts. The minerals are typically provided by a small proportion (about 0.1 to 0.5%) of an alkali metal phosphate and trace amounts of soluble compounds of magnesium, iron, molybdenum, zinc, copper, manganese, and boron.

The culture is conducted under aerobic conditions and at a temperature conventionally used in culturing microorganisms and is preferably about 20° to 30° C. One may use conventional shake-flask techniques for small runs. For larger-scale operation it is preferred to carry out the culture in a tank, applying agitation and aeration to the inoculated liquid medium, that is, to conduct the culture under submerged aerated conditions.

In a typical embodiment of the invention, an aqueous nutrient medium containing about 0.1 to 2% of sodium limonoate is inoculated with a culture of P-321–18. The inoculated medium is then cultured under aerobic conditions for a period of 24 to 96 hours, depending on such factors as temperature, concentration of nutrients, and the like. The cells containing the enzyme can be collected by centrifugation, washed, and frozen until used. For further separation the cell cake may be allowed to stand at room temperature to cause autolysis of the cellular material, or the cells can be disrupted by physical means. On centrifuging the autolysate, the LOR-P activity will then be in the liquid fraction. This liquid fraction may be further purified by conventional techniques used in the purification of enzymes, for example, dialysis, precipitation with salts, column chromotography, etc.

The preparation of LOR-P is further demonstrated by the following illustrative example.

Assay Method: LOR-P activity was assayed by following the increase in absorbancy at 340 m$\mu$ due to formation of dihydronicotinamide adenine dinucleotide phosphate (NADPH) from nicotinamide adenine dinucleotide phosphate (NADP) added to the reaction system as a hydrogen acceptor. In particular, activity was assayed in 1 ml. of a reaction mixture consisting of $10^{-2}$ M of Na-limonoate, 0.07 M Tris buffer at pH 8.0, $5 \times 10^{-4}$ M of NADP and 1–4 $m$ unit of enzyme. The reaction was carried out at 23° C. in a standard silica gel cuvette with 1-cm. light path. One unit of LOR-P is defined as the amount which catalyzes the production of 1 $\mu$mole of 17-dehydrolimonoate per minute under the above conditions. (The term "Tris" used herein is an abbreviated name for tris-(hydroxymethyl) aminomethane.)

EXAMPLE 1

A mineral salt solution containing the following ingredients was prepared:

| | | | |
|---|---|---|---|
| $KH_2PO_4$ | 0.20 gm. | $Fe_2(SO_4)_3.6H_2O$ | 0.054 mg. |
| $K_2HPO_4$ | 0.15 gm. | $(NH_4)P(Mo_3O_{10})_4$ | 0.024 mg. |
| $NaH_2PO_4.H_2O$ | 2.00 gm. | $ZnSO_4.7H_2O$ | 0.050 mg. |
| $Na_2HPO_4$ | 1.50 gm. | $CuSO_4.5H_2O$ | 0.0025 mg. |
| $NH_4NO_3$ | 0.60 gm. | $MnSO_4$ | 0.0055 mg. |
| $NaNO_3$ | 3.80 gm. | $H_3BO_3$ | 0.057 mg. |
| $MgSO_4.7H_2O$ | 0.30 gm. | $H_2O$ | 1000 ml. |

Into a 2-liter Erlenmeyer flask was placed 400 ml. of the above solution plus sodium limonoate to provide a concentration of 0.3%. The resulting medium was inoculated with 10 ml. of a 48-hour culture of P-321–18. The inoculated medium was shaken at room temperature for 98 hours. The cells were collected by centrifugation at 10,000 × g for 10 minutes, washed twice with cold 0.1 M potassium phosphate buffer at pH 7.0, and kept frozen until used.

Frozen cells were suspended in 10 volumes of cold 0.1 M phosphate buffer at pH 7.5 containing $10^{-2}$ M of dithiothreitol, and disrupted by a French press. After centrifugation at 10,000 × g for 10 minutes, the supernatant was brought to 90% saturation with $(NH_4)_2SO_4$ by the addition of solid salt with continuous stirring and was placed on an ice bath for 1 hour. The resulting precipitate was collected by centrifugation at 20,000 × g for 10 minutes, and dissolved in a minimum portion of 0.1 M potassium phosphate buffer, pH 7.5, containing $10^{-2}$ M dithiothreitol. The solution was then dialyzed for 2 hours against 0.05 M potassium phosphate buffer at pH 7.5 containing $10^{-4}$ M of dithiothreitol. (This buffer solution was gassed with nitrogen just prior to the dialysis.) The enzyme can be used in this form or can be further purified as below.

The dialysate was then applied onto a 2.5 × 20 cm. jacketed diethylaminoethylcellulose (DEAE-cellulose) column which had been equilibrated with 0.01 M Tris buffer at pH 7.0. The column, which was maintained at 4° C., was eluted with a linear gradient formed between 150 ml. of 0.01 M phosphate buffer at pH 7.0 and 150 ml. of the same buffer containing 0.8 M NaCl. The effluent was collected in 5-ml. fractions. Enzyme activity was found in fractions 18–22. The overall purification gave a 63-fold increase in activity over the crude extract and 46% of the original activity was recovered.

IDENTIFICATION OF PSEUDOMONAS-SP. 321 –18

The organism used in accordance with the invention was isolated from soil, and found to be characterized as follows:

Yellow, short (0.5 × 1.5 $\mu$), Gram-negative rod and motile with polar flagella. The organism was highly aerobic and did not produce fluorescence. The yellow pigment extracted with methanol had absorption peaks in that solvent at 424–428, 448–450 and 476–478 m$\mu$, and at 424, 450 and 480 in petroleum ether (B.P. 30°–60° C.).

Acid was weakly produced from glucose under oxidative conditions using the sensitive medium of Dye (New Zealand J. Sci., Vol. 5, p. 393, 1962). Tests for utilization of sugars, both mono- and di-saccharides, including sucrose, glucose, and galactose, were negative with Hugh and Leifson's medium (J. Bacteriol., Vol. 66, 24, 1953).

The bacterium grew slowly in a mineral salts-glucose medium. It grew slowly in tubed nutrient broth, but grew more rapidly in shake culture of nutrient broth. It also grew on citrate as the sole carbon source.

Nitrate was not reduced and no change was observed in litmus milk after 3 days of incubation at 28° C. The organism did not produce $H_2S$ but did produce indole. It also had oxidase and catalase activity. These results indicate that our organism fairly closely matches the genus Xanthomonas given by Hayword ("Methods of Identification in the Genus Xanthomonas." in "Identification Methods for Microbiologists," Part A, Gibbs, B. M., Skinner, F. A., Ed., London and New York, Academic Press, 1966.) The yellow pigment from culture of our bacterium, however, did not have absorption peaks at 418, 437 and 463 m$\mu$ in petroleum ether as dscribed by Starr and Stephens (J. Bacteriol., Vol. 87, p. 293, 1964). Also, our organism produced indole and oxidase in contrast to the above description of Xanthomonas. Based on DNA homology experiments, Deley et al (J. Gen. Microbiol., Vol. 42, p. 43, 1966) suggest that the genus Xanthomonas be eliminated and organisms so designated to be incorporated into the genus Pseudomonas. Because of the highly aerobic nature of our organism and its divergence from the description of the genus Xanthomonas, it is appropriate to assign it to the genus Pseudomonas. The organism does not correspond with any of the known species within this genus, and therefore it has been assigned the number 321–18 for purpose of identification. A culture of this organism has been deposited in the Stock Culture Collection of the U.S. Department of Agriculture, Northern Regional Research Laboratory, Peoria, Ill., 61604, where it was assigned the accession number NRRL B-5777R, and from which organization samples of this strain may be obtained.

Debittering of Citrus Juices

In accordance with this aspect of the invention, citrus juice is treated with LOR-P in order to reduce or eliminate the formation of bitterness in the juice. In the preferred practice of the invention the enzyme is applied to the juice without delay after its extraction from the fruit. The point is that LOR-P is only effective on the limonin precursor (limonoate A-ring lactone) which has an open D-ring, rather than on limonin itself, in which both A- and D-rings are closed. In freshly-prepared juices, most of limonin precursor is present as such and thus available for dehydrogenation by the enzyme. Where it is planned to subject the juice to a heat treatment (as in canning or concentration or drying), the process of the invention should be applied to the juice prior to such heating operation.

In conducting the debittering treatmennt of the invention the juice may be at its natural pH, or, for faster results, it may be adjusted to a pH of about 5.0–8.0. The pH adjustment may be accomplished by adding food-grade sodium hydroxide or other food-grade alkali. Next, LOR-P is added in a quantity sufficient to reduce the limonin precursor content to the level desired. Only a minor proportion of the enzyme is required. For example, in many cases useful results are obtained with the use of about 0.1 to 50 units of enzyme per 100 grams of juice. If a completely non-bitter juice is desired, the precursor level should be reduced to about 5–8 ppm. In the case of a juice with a high concentration of LARL or where rapid reduction of LARL is desired, more units of LOR-P may be used. Thus, it is within the compass of the invention to employ greater than 50 units of enzyme per 100 grams of juice. The content of limonin precursor can be monitored during the treatment by withdrawing aliquots, converting the precursor to limonin by boiling the juice in an acidic state, and then analyzing for limonin by known procedures.

More complete utilization of LOR-P can be realized by the addition of NAD or NADP in a quantity equivalent to or some fraction of the molar amounts of limonin precursor in the juice. The addition of NAD or NADP is, however, not essential and the debittering proceeds well without its addition.

The time required for the debittering treatmet depends on such factors as the pH, the amount of LOR-P used and the temperature. Generally, the debittering is complete within 20 minutes to 24 hours. The debittering can be conducted at temperatures from 0° to 35° C., more time being required at the lower temperatures. Usually for convenience, the reaction is conducted at room temperature (about 25° C.).

In the case of citrus products and by-products already containing limonin (such as ground seed products or heated or stored juice, concentrate, pulp, or peel products) it is necessary to first treat the product with alkali to achieve pH 7 or higher in order to hydrolyze the D-ring of limonin before or simultaneously with the LOR-P debittering treatment.

After the limonin precursor content has been reduced to the level desired (and when the pH of the juice has been initially increased), the juice is acidified to its original pH with an appropriate amount of a food-grade acid, such as citric, acetic, malic, fumaric, hydrochloric, phosphoric, and the like. The use of organic acids, especially citric, is preferred as they do not result in saltiness as do the inorganic acids. It may be desired to balance the salt formed with added sugar. It is, of course, obvious that if the juice is treated at its natural pH, the pH restoration step is unnecessary.

Following the enzyme treatment, the juice may be used directly or subjected to the usual preservation methods such as canning, concentration, dehydration, or freezing.

The debittering procedure of the invention is further demonstrated by the following illustrative examples.

EXAMPLE 2

Freshly-prepared navel orange juice was divided into a series of lots. Each lot was treated as follows.

No pH adjustment was made; thus each remained at the natural pH of the juice (3.5). A measured quantity of LOR-P was added to each lot together with measured amounts of NADP and NAD. Each mixture was then held at room temperature for a specific time period.

After the above-described enzyme treatment, the various lots and untreated samples (controls) were acidified and boiled for 15 minutes to convert all the limonin precursor to limonin. The limonin content of each was determined by specific thin-layer chromotographic assay. Taking into account the limonin contents of the treated samples and that of the controls, the effectiveness of each treatment was calculated.

The conditions used and the results obtained are summarized in the following tables.

Table I

| | | | Limonin Loss vs. Time Reaction conditions | | | Results |
|---|---|---|---|---|---|---|
| Lot No. | pH* | Time, hrs. | LOR-P added, units per 100 g. juice | NADP added, μmoles per 100 g. juice | NAD added, μmoles per 100 g. juice | Effectiveness (% loss of limonin) |
| Control | 3.5 | 0 | — | — | — | 0 |
| 1 | 3.5 | .25 | 6.0 | 100 | 100 | 23 |
| 2 | 3.5 | .50 | 6.0 | 100 | 100 | 37 |
| 3 | 3.5 | .67 | 6.0 | 100 | 100 | 42 |
| 4 | 3.5 | 2.0 | 6.0 | 100 | 100 | 57 |

*Natural pH of juice

Table II

| | | | Limonin Loss vs. Enzyme and Cofactor Conc. Reaction conditions | | | Results |
|---|---|---|---|---|---|---|
| Lot No. | pH* | Time, hrs. | LOR-P added, units per 100 g. juice | NADP added, μmoles per 100 g. juice | NAD added, μmoles per 100 g. juice | Effectiveness (% loss of limonin) |
| Control | 3.5 | — | — | — | — | 0 |
| 5 | 3.5 | .25 | 6.0 | 0 | 0 | 14 |
| 6 | 3.5 | .25 | 6.0 | 100 | 0 | 23 |
| 7 | 3.5 | .25 | 6.0 | 100 | 100 | 23 |
| 8 | 3.5 | .25 | 12.0 | 200 | 200 | 57 |

*Natural pH of juice

EXAMPLE 3

Navel orange juice concentrate was diluted with water to prepare a reconstituted juice, which was found to have a limonin content of 17.5 ppm. The juice was divided into a series of lots, each being treated as follows:

The pH was adjusted to 8.0 by the addition of sodium hydroxide in order to hydrolyze the limonin to the limonin precursor. Then, the pH was adjusted to a predetermined level (7.5) by addition of hydrochloric acid. A measured quantity of LOR-P was added and in one case NADP was also added. The mixture was incubated at room temperature for 20 hours.

After the enzyme treatment was completed, aliquots of various lots and untreated samples (controls) were acidified and boiled for 15 minutes to convert all the limonin precursor to limonin. The limonin content of each was determined by specific thin-layer chromatographic assay. Taking into account the limonin contents of the treated samples and that of the controls, the effectiveness of each treatment was calculated.

The conditions used and the results obtained are summarized below.

|         |     | Reaction conditions | | | Results | |
|---------|-----|------|---------------------------|-----------------------------|---------|---------------|
| Lot No. | pH  | Time hrs. | LOR-P added, units per 100 g. juice | NADP added, μmoles per 100 g. juice | Limonin ppm | Effectiveness % |
| Control | —   | —    | —    | —   | 17.5 | — |
| 1       | 7.5 | 20   | 1.18 | 200 | 3.5  | 80 |
| 2       | 7.5 | 20   | 1.18 | 0   | 5.4  | 69 |

EXAMPLE 4

Freshly-prepared navel orange juice was divided into a series of lots, each being treated as follows:

No pH adjustment was made; thus each remained at the natural pH of the juice (3.8). Measured quantities of LOR-P, NAD, NADP, or diaphorase were added to each lot. The mixtures were incubated at room temperature for 1.5 hours.

After the enzyme treatment was completed, the various lots and untreated samples (controls) were acidified and boiled for 15 minutes to convert all the limonin precursor to limonin. The limonin content of each was determined by specific thin-layer chromatographic assay. Taking into account the limonin contents of the treated samples and that of the controls, the effectiveness of each treatment was calculated.

The conditions used and the results obtained are summarized below:

In the co-pending application of Shin Hasegawa and Linda C. Brewster, Ser. No. 394,239, filed Sept. 4, 1973 a continuation-in-part of Ser. No. 250,764, filed May 5, 1972, and the application of the same inventors Ser. No. 399,890, filed Sept. 24, 1973 a continuation-in-part of Ser. No. 323,466, filed Jan. 15, 1973, which is a division of Ser. No. 250,764, filed May 5, 1972, there is disclosed the enzyme limonoate dehydrogenase, also designated by the systematic name limonoate:NAD oxidoreductase. This enzyme (referred to by the abbreviation LD) has certain properties in common with the enzyme (LOR-P) of the present invention.

Both enzymes exhibit ability to form 17-dehydro derivatives from limonoids. For example, both convert limonoate A-ring lactone into 17-dehydrolimonoate A-ring lactone. Both convert limonoic acid, or its salts, into 17-dehydrolimonoate.

However, LOR-P is a different enzyme from LD because it has many properties distinct from those of LD. The distinction is demonstrated by the following analysis.

1. LOR-P has maximum activity at pH 8.0, and is active over a wide pH range, including acidic pH's. On the other hand, LD has maximum activity at pH 9.5 and exhibits low activity at acidic pH's.

The above distinctions are demonstrated by the following data which compares the effects of pH on limonoate dehydrogenase activity of LOR-P and LD.

The activity of each enzyme is expressed in relation to its optimum activity. For instance, a relative activity of 14% means that at pH 5 the enzyme displays 14% of the activity which it exhibits at the optimum pH, which is 8.0 in the case of LOR-P and 9.5 in the case of LD.

| Effect of pH on Activity of LOR-P and LD | | |
|------|-------|------|
|      | Relative activity, % | |
| pH   | LOR-P | LD   |
| 5    | 14    | 0    |
| 5.5  | 18    | 3    |
| 6.0  | 30    | 5    |
| 6.5  | 40    | 12   |
| 7.0  | 60    | 20   |
| 7.5  | 80    | 40   |
| 8.0  | 100   | 53   |
| 8.5  | 96    | 75   |
| 9.0  | 85    | 86   |
| 9.5  | 75    | 100  |
| 10   | 65    | 84   |

|         |      | Reaction conditions | | | | Results |
|---------|------|------|-------------------------|----------------------------|------------------|-------------------|
| Lot No. | pH*  | Time, hrs. | LOR-P added, units per 100 g. juice | NAD and NADP added, μmoles of each per 100 g. juice | Diaphorase added, units per 100 g. juice | Effectiveness (% loss of limonin) |
| Control | —    | —    | —    | —   | —   | —   |
| 1       | 3.8  | 1.5  | 2.5  | 0   | 0   | 16  |
| 2       | 3.8  | 1.5  | 2.5  | 100 | 0   | 48  |
| 3       | 3.8  | 1.5  | 2.5  | 0   | 100 | 40  |

*Natural pH of juice

2. LOR-P requires as a cofactor either NAD or NADP, and exhibits twice as much activity with NADP as with NAD. On the other hand, LD requires NAD as a cofactor, and no activity is attained if NADP is substituted for NAD.

3. LOR-P is stable under acidic conditions, whereas LD is not. This item is demonstrated by the following data which provides the activity of each enzyme when held under particular conditions of pH, temperature and time.

| pH | Holding conditions Temp., °C | Time, min. | Activity retained, % LOR-P | LD |
|---|---|---|---|---|
| 3.5 | 23 | 5 | 90 | 6 |
| 3.5 | 33 | 5 | 31 | 0 |

4. LOR-P exhibits a low affinity for DEAE, whereas LD exhibits a high affinity therefor. This distinction is demonstrated by the following experiment:

A mixture of LOR-P and LD was placed on top of a DEAE cellulose column (2.5 × 20 cm.) which had been previously equilibrated to 0.01 M phosphate buffer at pH 7.0. The column was then eluted with a linear gradient consisting of 150 ml. of 0.01 M phosphate buffer at pH 7.0 and 150 ml. of the same buffer containing 0.8 M NaCl. The effluent was collected in 5-ml. fractions. It was found that the LOR-P was poorly retained by the column and eluted in fractions 18–22, whereas LD was well retained and eluted in fractions 38–48.

Having thus described the invention, what is claimed is:

1. The enzyme limonoate:NAD(P) oxidoreductase having the specific ability of converting limonoate A-ring lactone into 17-dehydrolimonoate A-ring lactone, and which is further characterized as follows:
   a. Effect of pH: exhibits maximum activity at pH 8.0, a relative activity of 60% at pH 7, 30% at pH 6, and 14% at pH 5,
   b. Cofactor requirement: either NAD or NADP, exhibits approximately twice as much activity with the latter,
   c. Stability under acid conditions: retains 90% of its activity when held at pH 3.5, 23° C., for 5 minutes, and 31% when held at pH 3.5, 33° C., for 5 minutes,
   d. and exhibits a low affinity for DEAE as compared with limonoate:NAD oxidoreductase.

2. The process of preparing limonoate:NAD(P) oxidoreductase, which comprises culturing Pseudomonas-sp. 321-18 (NRRL B-5777R) on a nutrient medium containing limonoate ions.

3. A process for preparing limonoate:NAD(P) oxidoreductase, which comprises
   a. culturing Pseudomonas-sp. 321-18 (NRRL B-5777R) on a nutrient medium containing an alkali-metal limonoate, and
   b. isolating limonoate:NAD(P) oxidoreductase from the so-cultured medium.

* * * * *